United States Patent [19]

Tanaka

[11] Patent Number: 5,211,702
[45] Date of Patent: May 18, 1993

[54] GOODS HANDLING METHOD AND APPARATUS THEREOF

[75] Inventor: Nobuhiro Tanaka, Miyashiro, Japan

[73] Assignee: Kao Corporation, Tokyo, Japan

[21] Appl. No.: 625,922

[22] Filed: Nov. 27, 1990

[30] Foreign Application Priority Data

Nov. 29, 1989 [JP] Japan .................. 1-309502
Dec. 4, 1989 [JP] Japan .................. 1-314530

[51] Int. Cl.$^5$ .............................................. B65G 6/40
[52] U.S. Cl. ............................ 414/404; 414/422; 414/627
[58] Field of Search ................ 414/266–269, 414/277–286, 627, 737, 786, 404, 422

[56] References Cited

U.S. PATENT DOCUMENTS

| | | | |
|---|---|---|---|
| 2,988,237 | 6/1961 | Devol | 198/349.6 |
| 3,351,219 | 11/1967 | Ruderfer | 414/280 |
| 3,716,147 | 2/1973 | Pipes | 414/627 |
| 3,750,804 | 8/1973 | Lemelson | 414/278 |
| 3,782,564 | 1/1974 | Burt | 414/281 |
| 3,820,667 | 6/1974 | Critchlow et al. | 414/627 |
| 3,921,828 | 11/1975 | Suizu | 414/281 |
| 3,978,995 | 9/1976 | Zollinger et al. | 414/281 |
| 4,252,497 | 2/1981 | Burt | 414/627 |
| 4,482,282 | 11/1984 | Wildmoser | 414/404 |
| 4,850,782 | 7/1989 | Focke | 414/627 |

FOREIGN PATENT DOCUMENTS

50-128876 10/1975 Japan .
56-48550 5/1981 Japan .

Primary Examiner—Joseph F. Peters, Jr.
Assistant Examiner—Thomas J. Brahan
Attorney, Agent, or Firm—Birch, Stewart, Kolasch & Birch

[57] ABSTRACT

A goods handling method and apparatus therefor, the method of which comprises the steps of sequentially taking out a desired number of goods from an accumulation of goods formed of a plurality of goods accumulated in the height direction, a plurality of goods accumulated in the depth direction, and one or more goods accumulated in the width direction, and discharging such taken-out goods into a container. The goods handling method and apparatus therefor, the method of which further comprises the steps of arranging the height of a bottom surface of goods to be taken out among the accumulation of goods generally equal to the height of a goods receiving table and thereafter, taking out the goods onto the receiving table, discharging such taken-out goods into the container, moving goods on the second row to the front row after all goods on the front row have been taken out, and then taking out the goods.

2 Claims, 14 Drawing Sheets

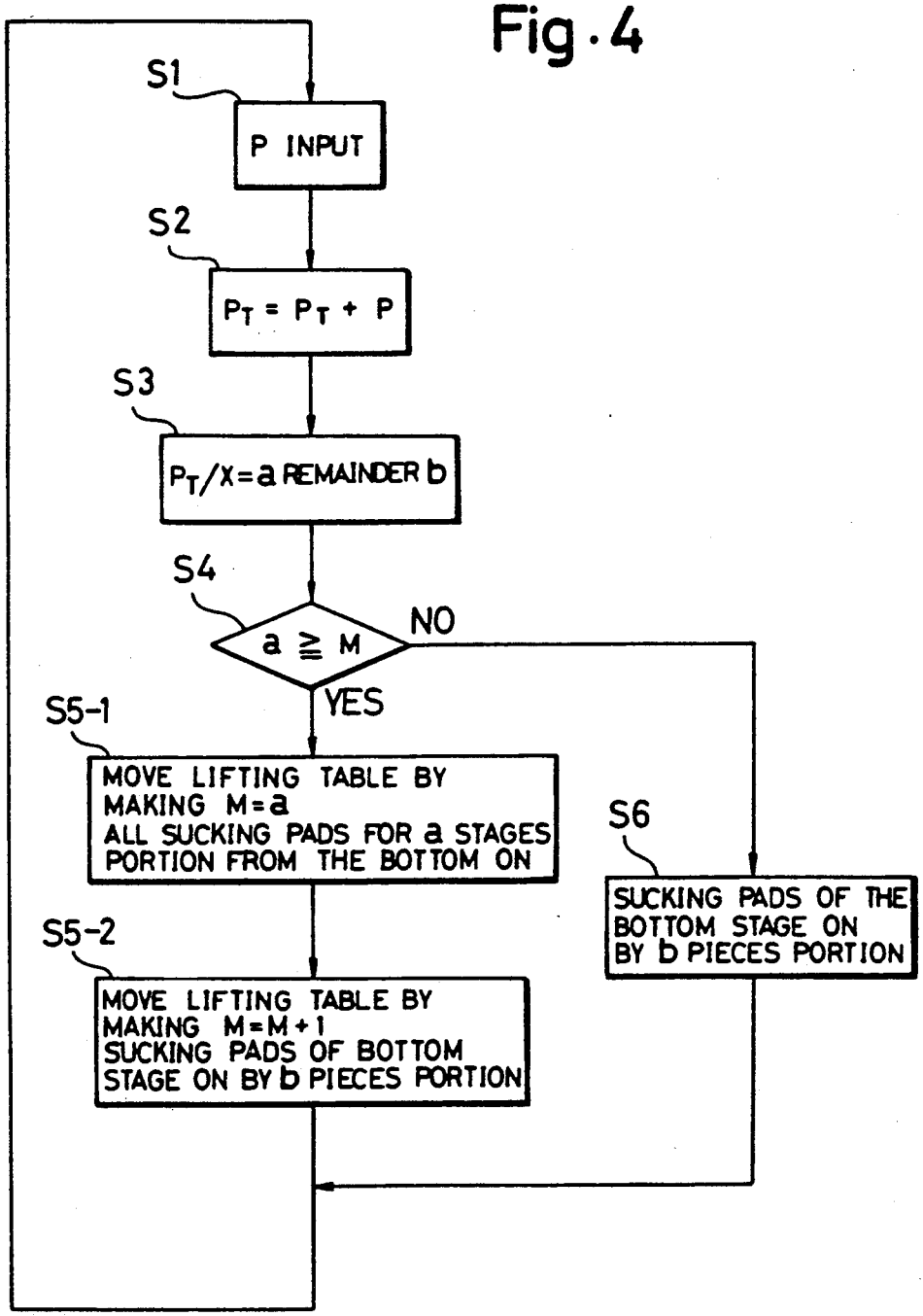

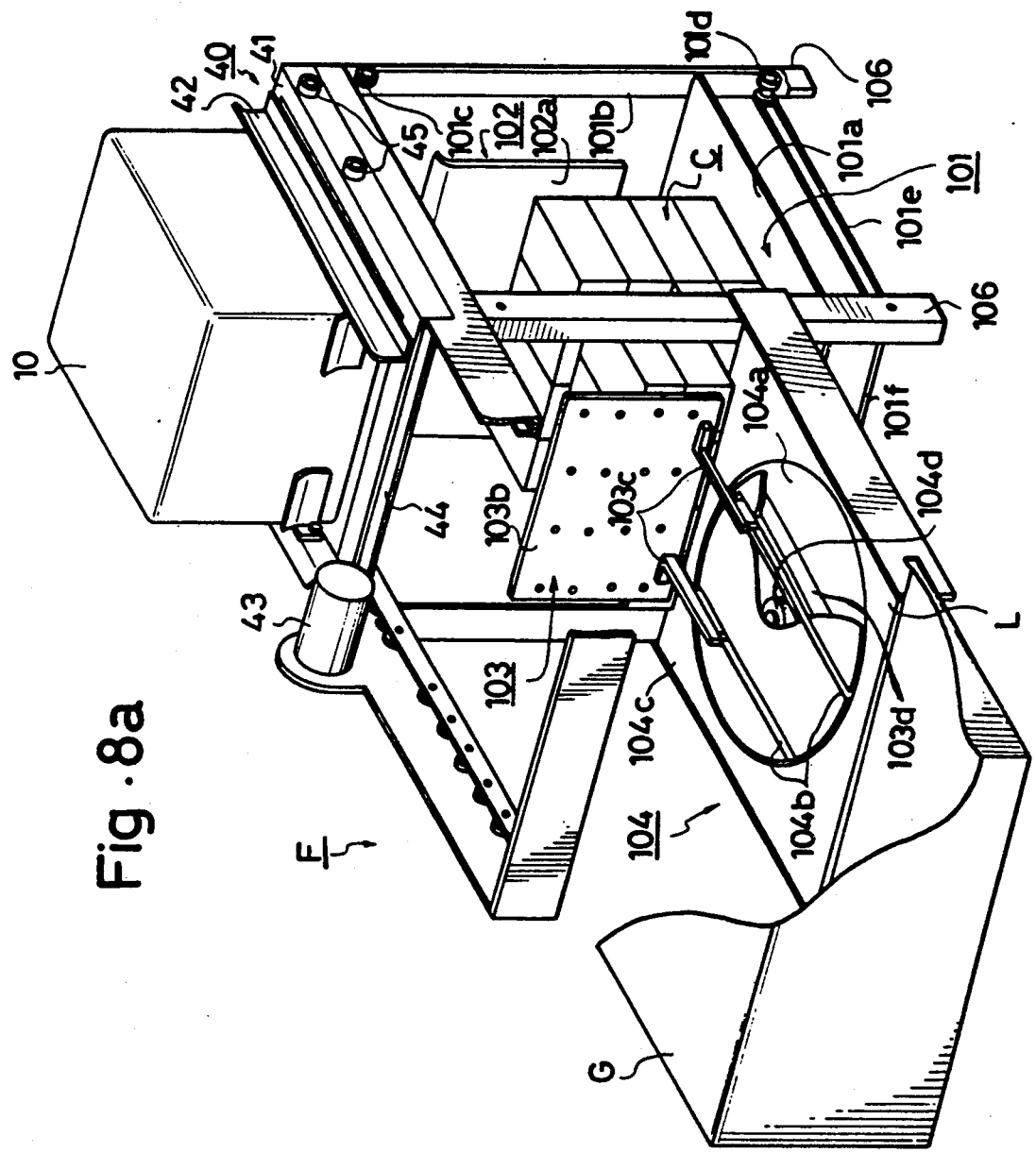

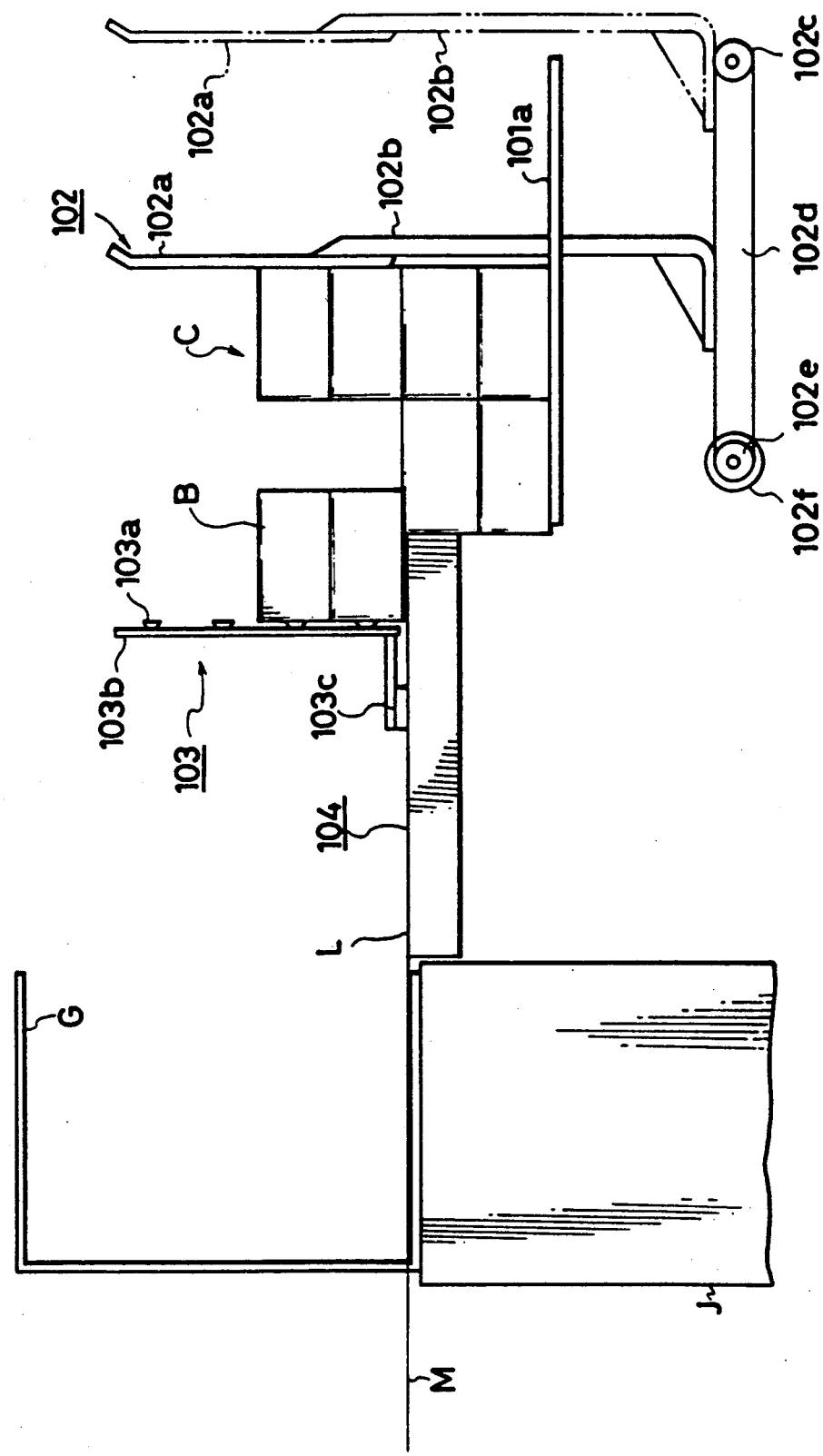

GOODS HANDLING METHOD AND APPARATUS THEREOF

BACKGROUND OF THE INVENTION

1. Field of the Invention

This invention relates to a goods handling method and an apparatus thereof for taking out a desired number of goods from an accumulation of goods which is formed by accumulating goods and discharging such taken-out goods into a container, and particularly to a goods handling method and an apparatus thereof which can be suitably used for picking up goods in a distribution center or for similar purposes.

2. Description of the Prior Art

As the prior art regarding a goods handling method and an apparatus thereof, there are known, for example, those as disclosed in Japanese Utility Model Early Laid-open Publication Nos. Sho 50-128876 and Sho 56-48550. The prior art disclosed in these publications will be described. In Japanese Utility Model Early Laid-open Publication No. Sho 50-128876, there is disclosed an automatic type part warehouse, an end face of which is divided into lines (lateral direction) and rows (vertical direction). End faces of each line and row are provided with a window for taking out and storing goods case, a plurality of goods cases being stored on an inclined floor in the inner direction, wherein an elevator having a lateral width equal to one line portion of the warehouse is vertically movably disposed in such a manner as to contact the end face of the take-out window, and by reciprocally moving a whirlable sucking pad mounted on the elevator in the depth direction of the warehouse, the part case can be taken out to the elevator side without interference from a part case stopper mounted to an end portion of the inclined floor.

Also, in Japanese Utility Model Early Laid-open Publication No. Sho 56-48550, there is disclosed a brick feeder for feeding bricks accumulated on a lifter by pushing out bricks on the top stage onto a feed conveyor by a pusher at every stage as the lifter is lifted up stage by stage.

However, the above-mentioned prior art have the following problems.

That is, in the automatic type part warehouse disclosed in Japanese Utility Model Early Laid-open Publication No. Sho 50-128876, although part cases (goods) can be taken out, one by one, from the end faces of the take-out windows formed by dividing the end face of the warehouse in lines and rows, there is no description or suggestion about a plurality of desired goods to be taken out, particularly, a desired number of goods to be taken out from an accumulation of goods formed by accumulating goods, and such taken-out goods being discharged into a container.

Also, as the brick feeder disclosed in Japanese Utility Model Early Laid-open Publication No. Sho 56-48550 is designed such that the bricks (goods) can be taken out at every stage, a desired number of goods cannot be taken out. Also, when a step exists between the goods which are arranged in the goods take-out direction, goods may be caught by the step, either preventing taking out of the goods or causing damage thereto. Furthermore, there is no description or suggestion that goods, which have been taken out onto the feed conveyor, are discharged into a container.

SUMMARY OF THE INVENTION

It is therefore an object of the present invention to provide a goods handling method and an apparatus thereof for taking out a desired number of goods from an accumulation of goods which is formed by accumulating goods and discharging such taken-out goods into a container, and particularly to a goods handling method and an apparatus thereof which can be suitably used for picking up goods in a distribution center or for similar purposes.

The object of the present invention is achieved by a goods handling method comprising sequentially taking out a desired number of goods from an accumulation of goods formed of a plurality of goods accumulated in the height direction, a plurality of goods accumulated in the depth direction, and one or more goods accumulated in the width direction, and discharging such taken-out goods into a container, said goods handling method further comprising arranging the height of a bottom surface of the goods to be taken out among said accumulation of goods generally equal to the height of a goods receiving table and thereafter, taking out said goods onto said receiving table, discharging such taken-out goods into said container, moving goods on the second row to the front row after all goods on the front row have been taken out, and then taking out said goods.

Also, the object of the present invention is achieved by a first embodiment of the invention which provides a goods handling apparatus as an apparatus favorably used for carrying out the above-mentioned goods handling method, in which a desired number of goods are sequentially taken out from an accumulation of goods formed of a plurality of goods accumulated in the height direction, a plurality of goods accumulated in the depth direction and one or more goods accumulated in the width direction and such taken-out goods are discharged into a container, said goods handling apparatus comprising a lifting device able to move upward and downward while supporting said accumulation of goods, a sucking device for sucking and taking out a desired number of goods by reciprocally moving sucking tools corresponding to the arrangement of goods of said accumulation of goods in said depth direction, a goods restraining device for moving said accumulation of goods toward said sucking device, a goods receiving table for receiving the goods taken out by said sucking tools of said sucking device, and a moving device for moving the goods taken onto said goods receiving table to a pushing position, the goods which have been moved to said pushing position being pushed and discharged into said container by said goods receiving table.

According to a method of the first embodiment of the present invention, the bottom level of desired goods among the accumulation of goods is made generally equal to the height of the goods receiving table by the lifting apparatus, desired goods are sucked by the sucking device in a state where the goods are restrained by the goods restraining device and drawn out onto the goods receiving table, then the goods, which have been drawn out onto the goods receiving table, are moved to a push-in portion for pushing goods into a container by the moving device, and thereafter, the goods can be pushed and discharged into the container by the goods receiving table.

Also, the object of the present invention is achieved by a second embodiment of the invention which provides a goods handling apparatus as another apparatus favorably used for carrying out the above-mentioned goods handling method, in which a desired number of goods are sequentially taken out from an accumulation of goods formed of a plurality of goods accumulated in the height direction, a plurality of goods accumulated in the depth direction and one or more goods accumulated in the width direction and such taken-out goods are discharged into a container, said goods handling apparatus comprising a lifting device able to move upward and downward while supporting said accumulation of goods, a sucking device for sucking and taking out a desired number of goods by reciprocally moving sucking devices corresponding to the arrangement of goods of said accumulation of goods in said depth direction, a goods restraining device for moving said accumulation of goods toward said sucking device a goods receiving table for receiving the goods taken out by said sucking tools of said sucking device, and a moving device for moving the goods taken onto said goods receiving table to a pushing position, the goods which have been moved to said pushing position being pushed and discharged into said container by said sucking device.

According to a method of the present invention using the second embodiment of the invention, the bottom level of desired goods among the accumulation of goods is made generally equal to the height of the goods receiving table by the lifting apparatus, desired goods are sucked by the sucking device in a state where the goods are restrained by the goods restraining device and drawn out onto the goods receiving table, then the goods, which have been drawn out onto the goods receiving table, are moved to a push-in portion for pushing goods into a container by the moving device, and thereafter, the goods can be pushed and discharged into the container by the sucking device.

BRIEF DESCRIPTION OF THE DRAWINGS

FIG. 3b is a side view of the goods take-out device shown in FIG. 3a;

FIG. 3c is a perspective view showing the operation for pushing goods into a container using the push-in device of the goods take-out device shown in FIG. 3a;

FIG. 4 is a flowchart showing one preferred embodiment of a goods take-out method in which the goods take-out apparatus shown in FIGS. 3a, 3b and 3c is used;

FIG. 8a is a perspective view showing the second embodiment of the goods take-out device of the present invention;

FIG. 8b is a side view of the goods take-out device shown in FIG. 8a;

DETAILED DESCRIPTION OF THE INVENTION

A goods handling method of the present invention will now be described, together with goods handling facilities in which the goods handling apparatuses of the first embodiment of the invention and the second embodiment of the invention capable of carrying out this method, as shown in FIGS. 1 through 10d. The various embodiments set forth hereinafter are suitable for taking out box-shaped goods such as detergent for clothing and a bag-shaped goods such as paper diapers from a case such as a corrugated carton box having an opening portion.

EMBODIMENT 1

This embodiment is one embodiment of the apparatus and one embodiment of the method of the present invention in which the apparatus of this embodiment is used.

Figure 1:
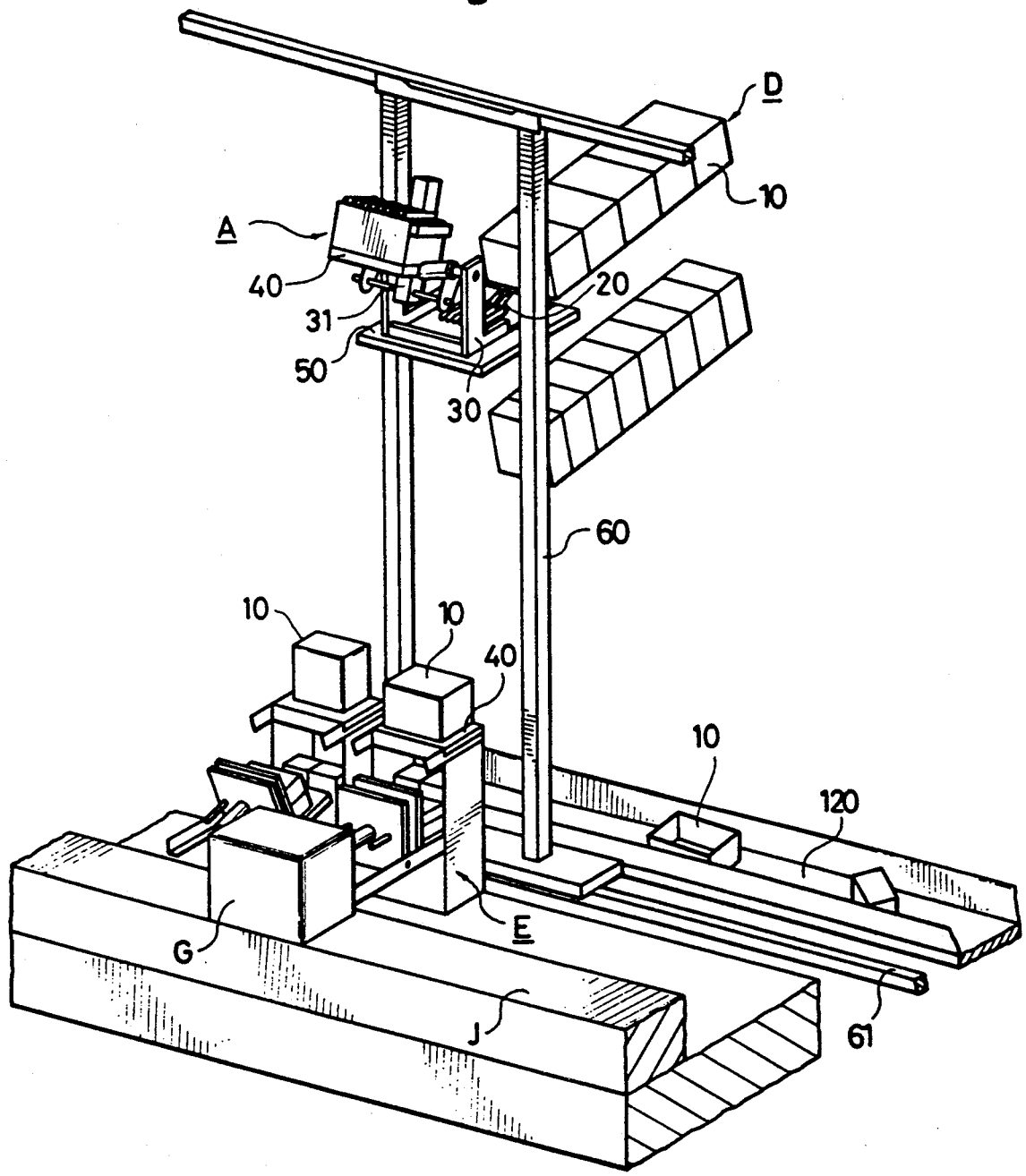
FIG. 1 is a perspective view showing a goods handling facility using the first embodiment goods handling apparatus of the present invention.
Figure 2:
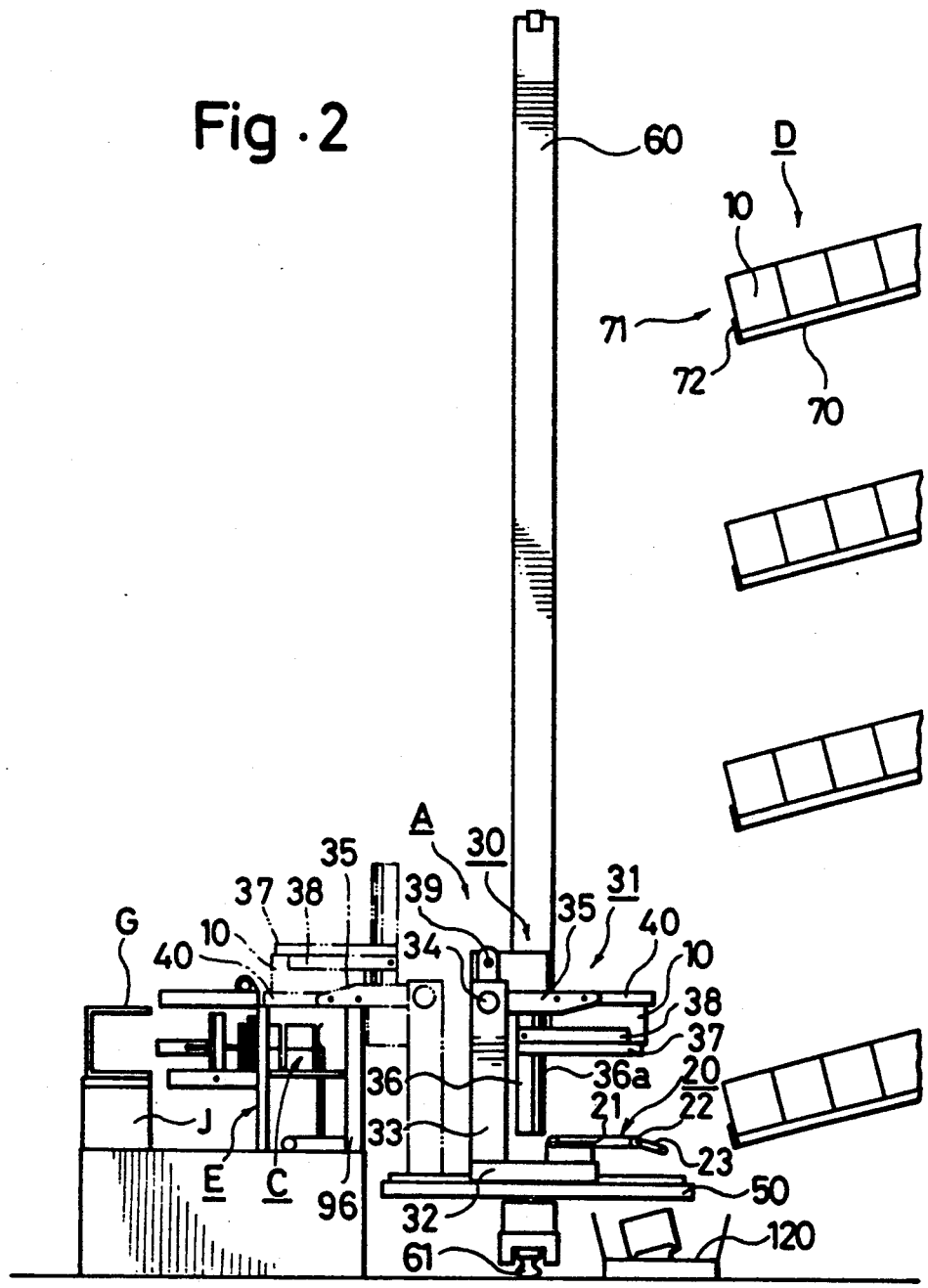
FIG. 2 is a side view of the embodiment of FIG. 1.

A goods handling facility having a goods take-out device E according to one embodiment of the apparatus, as shown in FIGS. 1 and 2, comprises a storage facility D for storing cases 10 containing goods B as a goods accumulation group in a plurality of stages and a plurality of rows, a goods shifting apparatus A disposed in such a manner as to be able to move upward and downward and leftward and rightward at a front end of the storage facilities D and adapted to shift the cases 10 from the storage facilities D, a goods take-out device E disposed adjacent to the goods shifting apparatus A and adapted to take out a desired number of goods B from the goods accumulation group C which have been shifted from the cases 10 by the goods shifting apparatus A, a container G for containing goods B taken out of the goods take-out device E, and a carrier conveyor J for carrying the container G to the next process.

The goods shifting apparatus A comprises a case take-out device 20 for taking out a case 10 from the storage facility D, a superposing device 31 for lifting the case 10 taken out by the case take-out device 20 and superposing the same on a goods take-out tool 40 disposed thereabove, an inverting device 30 for inverting the case 10 and the goods take-out tool 40 to the goods take-out device E side as will be described afterward, a carriage 50 with the case take-out device 20, the inverting device 30, placed thereon, and a stacker crane 60 for vertically movably supporting the carriage 50 and able to reciprocally move rightward and leftward.

Also, the goods take-out device E of this embodiment, as shown in FIGS. 2, 3a, 3b, and 3c, comprises a lifting device 91 for receiving and supporting only the goods accumulation group C from the case 10 inverted by the goods shifting apparatus A through the goods take-out tool 40 and for ascending and descending the bottom surface of the desired number of goods B to the take-out position, a goods restraining device (movement restraining device) 92 for restraining the goods accumulation group C within the lifting device 91 in order not to move in the direction opposite to the take-out direction of the goods accumulation group C and for moving the goods accumulation group C toward the sucking device 93, the sucking device 93 for reciprocally moving the sucking tools (sucking pads) 93a corresponding to the arrangement of the goods B of the goods accumulation group C in the depth direction and for sucking and taking out a desired number of goods B, a goods receiving table 95a (goods receiving plate) for receiving the goods B taken out by the sucking pad 93a of the sucking device 93, and a moving device 94 for moving the goods B taken out to the goods receiving plate 95a to the push-in position, the goods B moved to the push-in position being pushed into the container G by the goods receiving table 95a.

Next, the various component elements constituting the goods handling facilities will be described in order and in detail.

The goods take-out tool 40, the case take-out device 20, and inverting device 30, etc. for constituting the goods shifting apparatus A will be described with reference to FIGS. 1 through 3c.

The case take-out device 20, as shown in FIG. 2, is disposed on a traveling table 32, and comprises a stationary conveyor 21, and a swing conveyor 23 connected next to the stationary conveyor 21 through a supporting shaft 22, the case 10 being taken out from a gravity flow rack 70 of the storage facility D by swinging the front end side of the swing conveyor 23 upward and downward.

The inverting device 30, as shown in FIG. 2, comprises a traveling table 32 which is carried on a carriage 50 of a stacker crane 60. Traveling table 32 moves toward and away from the cases 10 stored in the gravity flow racks 70 (left and right as shown in FIG. 2). A frame 33 is erected on the traveling table 32, and a rotary shaft 34 is mounted in the vicinity of the upper end of the frame 33. A first clamping hand 35 is mounted on the rotary shaft 34 in such a manner as to be opened and closed in the axial direction thereof (hereinafter referred to as the "right and left direction") and adapted to hold the goods take-out tool 40. A second clamping hand 37 is disposed in such a manner as to be able to move upward and downward along a guide member 36 extending down in the vicinity of the rotary shaft 34 while holding the case 10. The second clamping hand 37 is adapted to superpose the case 10 on the goods take-out tool 40 held by the first clamping hand 35. A centering hand 38 is provided for centering a case 10 on the second clamping hand 37. The first and second clamping hands 35, 37, the centering hand 38, and the guide member 36 constitute the superposing device 31. Accordingly, the inverting device 30 is constructed such that the superposing device 31 is integrally rotated about the rotary shaft 34. The first clamping hand 35 is constructed in such a manner as to be opened and closed in accordance with activation of a screw shaft 39 mounted on a guide member 36 in parallel relation with the rotary shaft 34, that is, screw shaft 39 provided with a right screw formed on one side from the center thereof and a left screw form on the other side. The first clamping hand 35 is provided with projecting portions (not shown) formed on the inner side thereof and adapted to engage with engaging concave portions (see FIG. 3a) formed in both sides of a frame 41 of the goods take-out tool 40 so that the goods take-out tool 40 is firmly held by the first clamping hand 35 and will not be dropped during the inverting operation. Likewise, the centering hand 38 is disposed in a parallel relationship with the rotary shaft 34 and opened and closed in accordance with activation of a screw shaft (not shown) similar to the screw shaft 39 supported by the second clamping hand 37. Also, the guide member 36 is provided on its inner side with a screw shaft 36a, and by driving the screw shaft 36a, the second clamping hand 37 is moved upward and downward.

Also, the apparatus designed such that the goods take-out tool 40, as shown in FIG. 2, is placed on the goods take-out device E from a state where the goods take-out tool 40 is located above the case take-out device 20 by the inverting device 30. The goods take-out tool 40 comprises a frame 41, a pair of guides 42, 42 fixedly attached to the frame 41, and a shutter 44 reciprocally moved along the guides 42, 42 through a motor 43 to open and close an opening portion of the case 10 (see FIG. 3a). Also, each of the guides 42, 42 is provided with a needle-like projection (not shown) formed on its surface contacting with the case 10 in order to fix the case 10. Accordingly, by lifting a lifting table 91a constituting a lifting device 91 of the goods take-out device E and opening the opening portion of the case 10 by drawing out the shutter 44 and then lowering the lifting table 91a, the goods accumulation group C can be taken out of the case 10. After the goods accumulation group C has been shifted to the goods take-out device E from the case 10 through the goods take-out tool 40, desired goods B among the goods accumulation group C is taken out to the container G in accordance with a picking command.

Furthermore, the stacker crane 60 is designed to travel on a travel rail 61 laid along take-out frontages 71 of the respective gravity flow racks 70 and is provided with the case take-out device 20 and the inverting device 30 disposed on the carriage 50 as such the devices 20 and 30 can be moved upward and downward.

Also, the gravity flow racks 70 of the storage facilities D comprise inclined multi-row and multi-stage roller conveyors. Each gravity flow rack 70 is provided with the take-out frontage 71 formed at its inclined front end, and the inclined roller conveyor is provided at its front end portion with a stopper 72, so that the case 10 slides down the inclined roller conveyor by its dead weight and is retained by the stopper 72.

Next, the goods take-out device E of the first embodiment of the invention will be described with reference to FIGS. 3a, 3b, and 3c.

The goods take-out device E is disposed between the carrier conveyor J and the travel rail 61 for carrying the container G. The goods take-out device E is adapted to receive the goods accumulation group C from the goods take-out tool 40 and pushes a required number of goods B into the container G. The lifting device 91 receives the goods accumulation group C taken out of the case 10 through the goods take-out tool 40 and moves upward and downward to a desired position. The lifting device 91, as shown in FIG. 3a, comprises the lifting table 91a on which the goods accumulation group C is placed, a wire 91b for lifting the four corners of the lifting table 91a, and a pair of pulleys 91c, 91d having the wire 91b wound thereon and rotatably mounted on the frame 96, these component parts being actuated by a motor 91g through a belt 91e wound on the pulley 91d and a drive shaft 91f connected with the belt 91e.

Figure 3A:
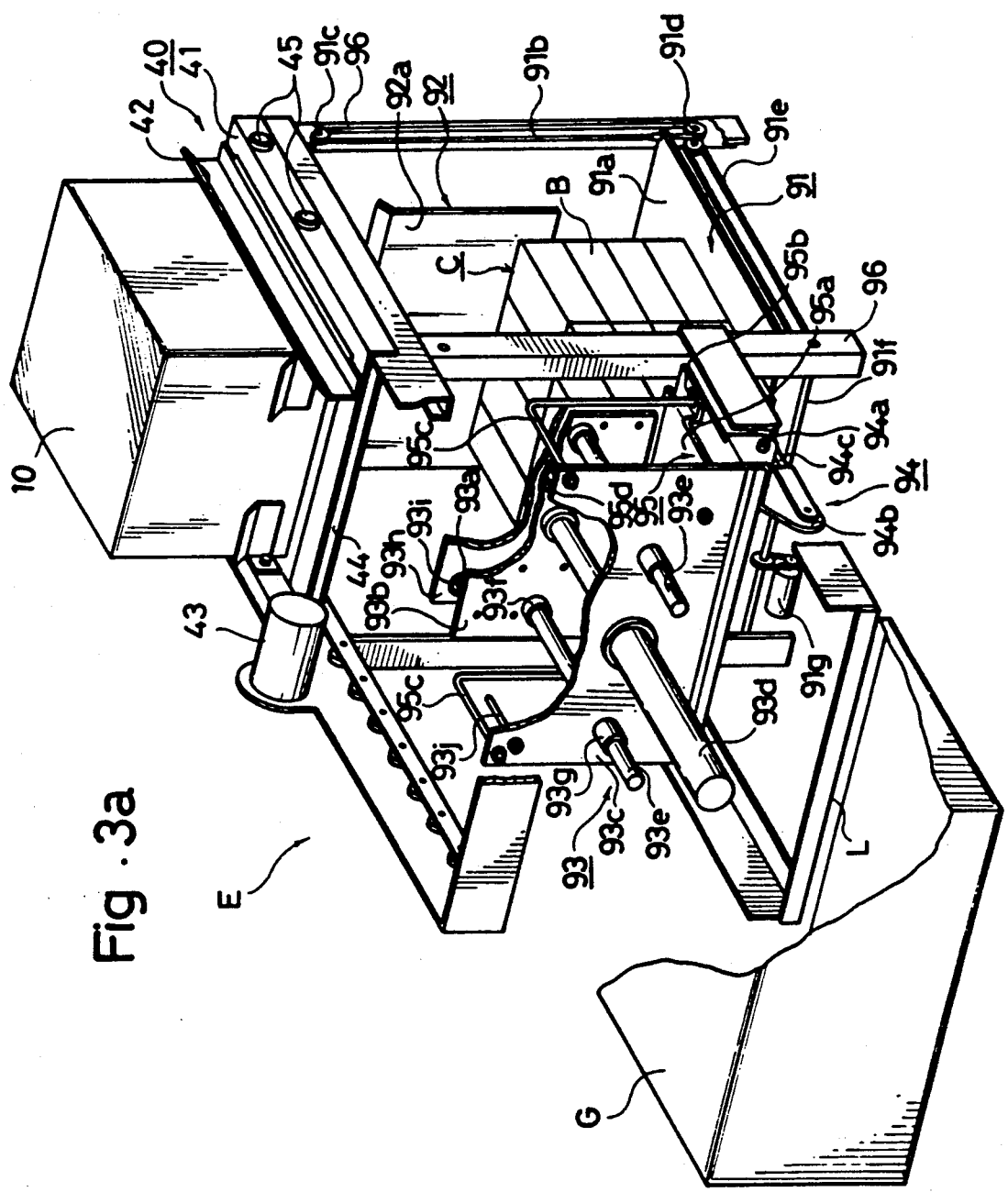
FIG. 3a is a perspective view showing the first embodiment of the goods take-out device of the goods handling apparatus of the present invention.
Figure 3B:
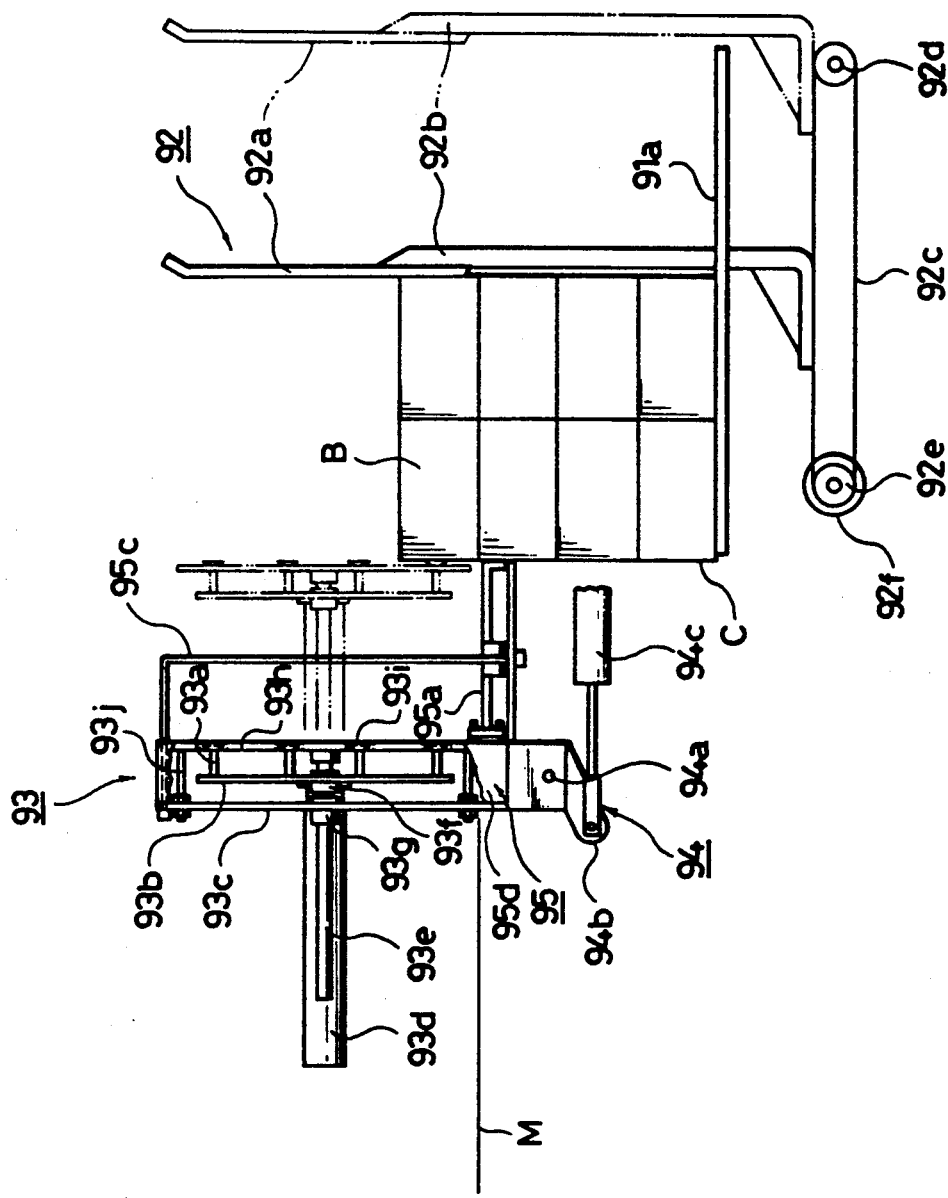
Figure 3C:
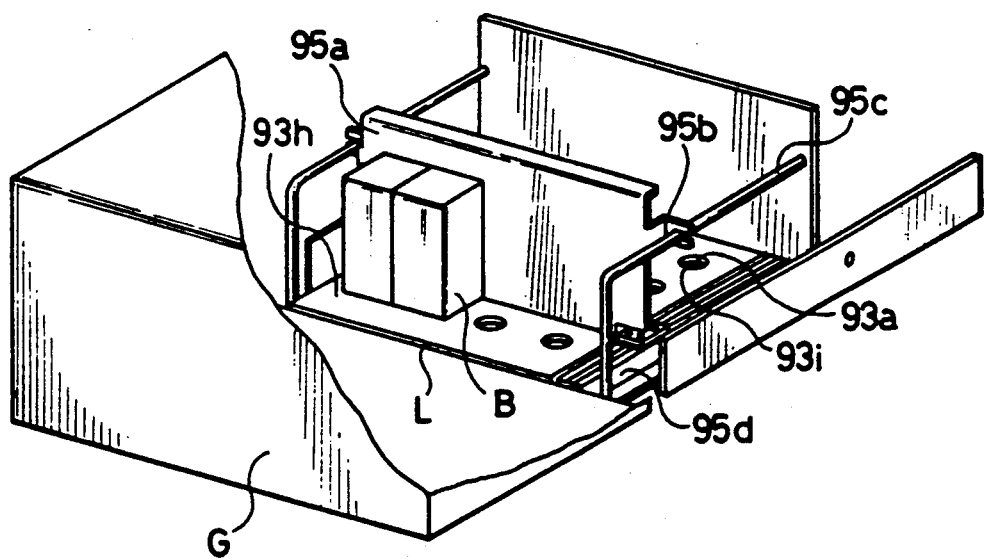

The movement restraining device 92, as shown in FIGS. 3a and 3b, contacts the goods accumulation group C supported on the lifting table 91a of the lifting device 91 from a rear side (right-hand side in FIG. 3b) thereof and moves it toward the container G. The movement restraining device 92 comprises a pair of sprockets 92d, 92e disposed beneath front and rear leg portions of the frame 96, a chain 92c looped around the sprockets 92d, 92e, and a movement restraining plate 92a connected with the chain 92e and erected around the leg portions through a mounting metal piece 92b, the movement restraining plate 92a being able to be reciprocally moved forward and backward by a drive motor 92f. The mounting metal piece 92b for supporting the movement restraining plate 92a is reciprocally moved along a cut-away groove (not shown) formed in the lifting table 91a. By moving (advancing) the movement restraining plate 92a toward the container G, the goods accumulation group C is brought to a front edge of the lifting table 91a and the backward movement of goods B is restrained. The goods accumulation group C advanced to the front edge of the lifting table 91a through the movement restraining device 92 is moved upward and downward to a position where the bottom level of desired goods B corresponds to the picking number by the lifting device 91, and a desired number of goods B are drawn into the goods receiving plate 95a by the sucking device 93.

The sucking device 93 comprises sucking pads 93a disposed in such a manner as to correspond to X pieces of goods B arranged in the width direction and Y pieces of goods B arranged in the height direction on a surface (front surface) on the side for receiving the goods accumulation group C, a plate 93b on which the sucking pads 93a are attached, a base plate 93c juxtaposed to the plate 93b, and a cylinder 93d which is connected at its front end with the plate 93b disposed generally at the center of the base plate 93c, the sucking pads 93a being reciprocally moved in the depth direction (forward and backward direction) of the goods accumulation group C by the cylinder 93d, a pair of guide bosses 93f, 93f and another pair of guide bosses 93g, 93g being fixedly disposed to the plate 93b and the base plate 93c respectively (see FIG. 3a), a slide shaft 93e being thrust therethrough, a plate 93h being movable through the slide shaft 93e. The plate 93h is provided with a plurality of holes 93i corresponding to the arrangement of the sucking pads 93a, so that the sucking pads 93a can move in and out the holes 93i of the plate 93h. With such construction as mentioned, when the cylinder 93d is actuated, the sucking pads 93a are protruded from the holes 93i of the plate 93h (the state as indicated by the two dots chain line), and by returning the cylinder 93d in the state where a desired number of goods B are sucked by the sucking pads 93a, the goods B can be drawn onto a goods receiving plate 95a. That is, when the cylinder 93d is returned, the plate 93h is abutted against and stopped by a stopper 93j mounted on the base plate 93c, only the plate 93b on which the sucking pads 93a are mounted is returned, and by stopping the sucking action of the sucking pads 93a, the sucked goods B are released. With respect to the goods B having a comparatively large dimension in the depth direction relative to the dimension in the height direction, it may be designed such that after the goods B, which have been drawn onto the goods receiving plate 95a, are moved to a push-in portion L, the sucking operation of the sucking pad 93a is stopped. That is, as described in the foregoing, when the cylinder 93d is returned, the sucking pads 93a are hidden in holes 93i of the plate 93h. However, since the sucking pads 93a are made of rubber, they are readily deformed. Therefore, the goods B, while being sucked by the sucking pads 93a, are moved to the push-in portion L. When the sucking operation of the sucking pads 93a is stopped, the sucking pads 93a release the goods B. Then, the sucking pads 93a return to the original state and are completely stored in the holes 93i.

The goods B, which have been drawn onto the goods receiving plate 95a, are moved to the push-in portion L on the container G side by the moving device 94.

The moving device 94 is adapted to rotate the sucking device 93 by 90 degrees (the state shown in FIG. 3c) and comprises, as shown in FIGS. 3a and 3b, a rotational shaft 94a for rotatably supporting the base plate 93c attached to a lower end of the sucking device 93, a link 94b for rotating the base plate 93c connected to one end of the rotational shaft 94a about the rotational shaft 94a, and a cylinder 94c disposed between the link 94b and the frame 96 and able to be expanded and contracted therebetween in order to rotate the base plate 93c. And, as is shown in FIG. 3c, after goods B are moved to the push-in portion L through the moving device 94, the goods B are pushed into the container G by a push-in device 95. The push-in device 95 comprises a goods receiving plate 95a, an engaging piece 95b mounted on each side of an upper portion of the goods receiving plate 95a, and a rodless cylinder 95d for reciprocally moving the goods receiving plate 95a engaging with the guide 95c through the engaging piece 95b in the direction of the container G.

Next, there will be described one mode for carrying out a goods handling method (goods take-out method) of the present invention employing a goods handling facilities using the goods take-out tool 40 and the goods take-out device E of this embodiment.

In the gravity flow rack 70 in the storage facilities D, cases 10 containing, for example, goods accumulation group C consisting of one kind of goods B are plurally stored in the forward and backward direction. On the other hand, when the shutter 44 of the goods take-out tool 40 is opened and the goods accumulation group C within the case 10 is transferred to the lifting table 91a of goods take-out device E, the inverting device 30 is moved to a position corresponding to the goods take-out tool 40 to which the empty case 10 is placed by the traveling action of the stacker crane 60 and the vertical movement of the carriage 50 to advance the traveling table 32 toward the goods take-out tool 40, and the goods take-out tool 40 and the empty case 10 are held by the first clamping hand 35, the second clamping hand 37 and the centering hand 38. At that time, the engaging convex portion of the first clamping hand 35 is brought into engagement with the engaging concave portion 45 of the goods take-out tool 40. The superposing device 31 is rotated by approximately 10 degrees clockwise from the state indicated by the two dotted chain line of FIG. 2 about the rotary shaft 34. The traveling table 32 is advanced to a position indicated by the solid line in FIG. 2 and in the meanwhile, the superposing device 31 is further rotated by approximately 170 degrees clockwise (the state indicated by the solid line in FIG. 2). Then, in order to discharge the empty case 10 onto a discharge conveyor 120, when the empty case 10 is lowered to the level of the fixed conveyor 21 by the second clamping hand 37 and the fixed conveyor 21 is rotated clockwise, the empty case 10 is drop discharged onto the discharge conveyor 120. At that time, in order to secure a dropping space for the case 10, the traveling table 32 is retreated from the take-out frontage 71 and the empty case 10 is dropped. After the empty case 10 has been dropped, the traveling table 32 is moved to a position corresponding to a predetermined take-out frontage 71 by the vertical movement of the carriage 50 and the traveling action of the stacker crane 60 and thereafter the traveling table 32 is advanced to the take-out frontage 71. Then, the swing conveyor 23 is swung counterclockwise about the supporting shaft 22, and the fixed conveyor 21 and the swing conveyor 23 are further rotated counterclockwise to take out the case 10 from the take-out frontage 71 onto the second clamping hand 37. When the traveling table 32 advances to the position indicated by the solid line, the traveling table 32 is moved to a position corresponding to a predetermined goods take-out device E by the vertical movement of the carriage 50 and the traveling action of the stacker crane 60, and the second clamping hand 37 is moved upward. At the same time, the case 10 is centered by the centering hand 38 in order to superpose the case 10 on the goods take-out tool 40 held by the first clamping device 35. As the case 10 is fed to the gravity flow rack 70 in such a state as having its opening portion on top, by superposing the goods take-out tool 40 on the opening portion of the case 10 and closing the opening portion by the shutter 44, the goods B contained in the case 10 are not dropped even if the case 10 is rotated by 180 degrees. The superposing device 31 is rotated counterclockwise by 170 degrees about the rotary shaft 34 to back the traveling table 32 away from the take-out frontage 71 and toward the goods take-out device E, and then the superposing device 31 is further rotated by 10 degrees counterclockwise to place the goods take-out tool 40 and the case 10 onto a frame 96 (the state indicted by the two dotted chain line of FIG. 2) in their inverted states. Thereafter, the first clamping hand 35, and the centering hand 38 are opened to advance the traveling table 32 to a position as indicated by the solid line of FIG. 2 to wait for the next shifting operation.

In this way, the case 10 is placed on the frame 96 of the goods take-out device E together with the goods take-out tool 40 to await the next shifting operation, the goods B on the lifting table 91a of the goods take-out device E are all taken out. The goods take-out tool 40 opens the shutter 44 and transfers the goods accumulation group C from the case 10 onto the lifting table 91a. At that time, in the goods take-out device E, the movement restraining plate 92a is retreated to a position (the position indicated by the two dotted chain line of FIG. 3b) where the movement restraining plate 92a and the lifting table 91a do not interfere with each other along the cutaway groove, and thereafter, the lifting table 91a is lifted upwardly to a position immediate below the goods take-out tool 40 and receives only the goods accumulation group C contained in the case 10 from the goods take-out tool 40 in which the shutter 44 was opened. Thereafter, the lifting table 91a is lowered until the bottom surface of the goods B of the uppermost stage of the goods accumulation group C is equal to a desired goods surface level (picking level) (See FIG. 3b) corresponding to the position of the goods receiving table 95a. The movement restraining plate 92a pushes the goods accumulation group C onto the lifting table 91a and stops at a position where the front surfaces of the goods accumulation group C are generally flush with the front end of the lifting table 91a. Then, when the sucking device 93 sucks the goods B by a desired number (order number) with its sucking pads 93a and causes the cylinder 93d to draw the goods B onto the goods receiving plate 95a, the moving device 94 is actuated to incline the goods receiving plate 95a forwardly by 90 degrees so that the goods B directly face the opening of the container G at the push-in portion L on the container G side shown in FIG. 3c. Thereafter, the push-in device 95 is actuated to advance the goods receiving plate 95a so that the goods B ar pushed into the container G.

The control flow of the take-out operation of the goods B will further be described with reference to FIG. 4 and FIGS. 5a through 5g. One mode for carrying out the goods take-out method of this embodiment is such that the bottom level of the goods B on the bottom stage of the goods B which are ready to be drawn onto and supported by the goods receiving plate 95a (i.e. the state where the upper stages of goods B are placed on the lower stages of goods B, and in the foregoing state, the goods B are ready to be drawn onto the goods receiving plate 95a). These goods B ready to be drawn are brought flush with the level of the goods receiving plate 95a by the lifting device 91 so that a plurality of goods B are simultaneously taken out.

In the control flowchart of FIG. 4, order number is represented by P, the sum of order number by $P_T$, and the arrangement number of the goods B in the width direction (horizontal direction) by X. The sum of order number $P_T$ is divided by X and the quotient obtained is represented by a and its remainder by b, and the level of the lifting table 91a by M, and the initial values of the sum of order number $P_T$ and the level M of the lifting table 91a are defined as 0 and 1 respectively.

First, when the order number P is input into a computer (not shown)(step 1), the order number P is added with the sum of order number $P_T$ (step 2), and the new sum of order number $P_T$ obtained in step 2 is divided by the arrangement number X of the goods B arranged in the horizontal direction to find the quotient and the remainder b (step 3). The quotient a obtained in step 3 is compared with the level M of the lifting table 91a in order to judge whether the quotient a is the level M or more (step 4). If the quotient a is the level M or more of the lifting table 91a, then it goes to step 5-1, and if the quotient a is less than the level M of the lifting table 91a, then it goes to step 6. In step 5-1, the quotient a is substituted for the current level M of the lifting table 91a in order to raise the lifting table 91a to a level (picking level) corresponding to the value of the quotient and all sucking pads 93a covering stages portion counted form the bottom are activated to draw out the goods B. Then, it goes to step 5-2 where 1 is added to the current level M of the lifting table 91a to raise the lifting table 91a by one stage so that b pieces portion among the sucking pads 93a of the bottom stage are turned on to draw out the goods B by b pieces. In step 6, the lifting table 91a is not vertically moved and the sucking pads 93a of the bottom stage are turned on by b pieces in order to draw out the goods B. In step 4, if a=M, as the level M of the lifting table 91a is not substituted in step 5-1, the lifting table 91a is not moved.

Figure 5A:
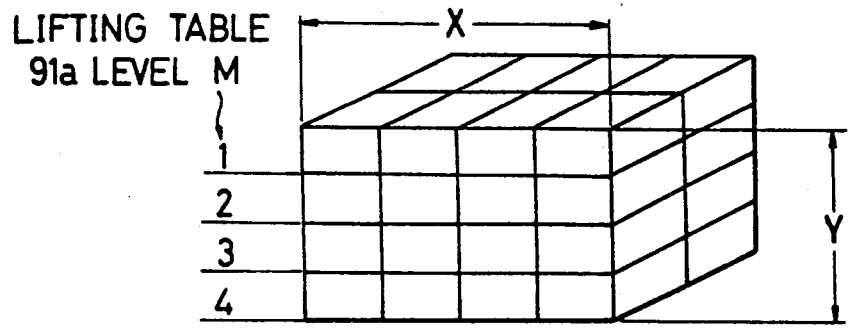
FIG. 5a, 5b, 5c, 5d, 5e, 5f, and 5g are explanatory views for explaining the take-out order of goods.
Figure 5B:
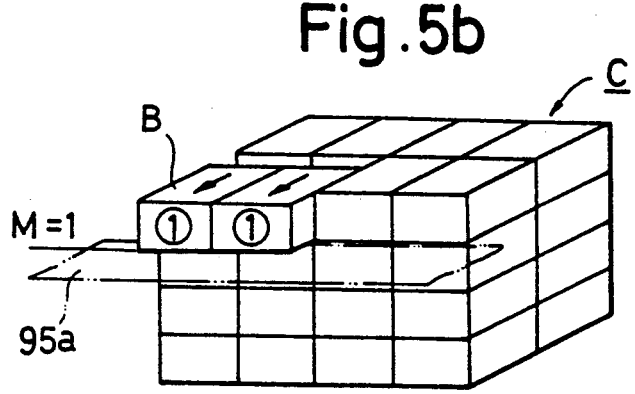
Figure 5C:
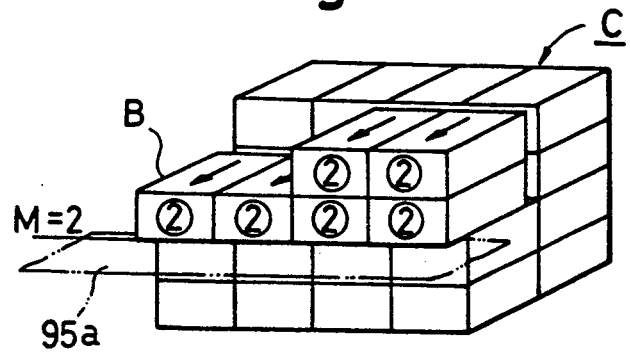
Figure 5D:
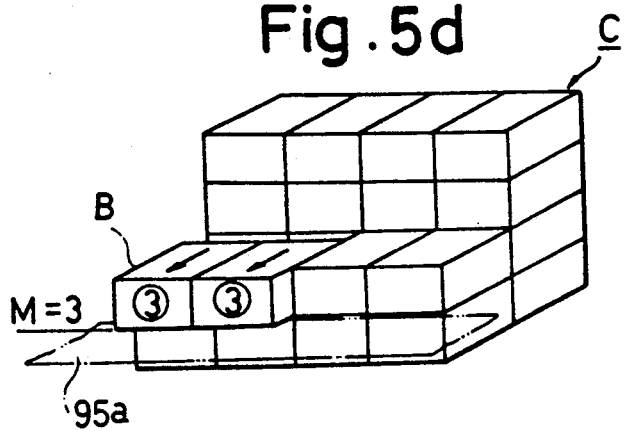
Figure 5E:
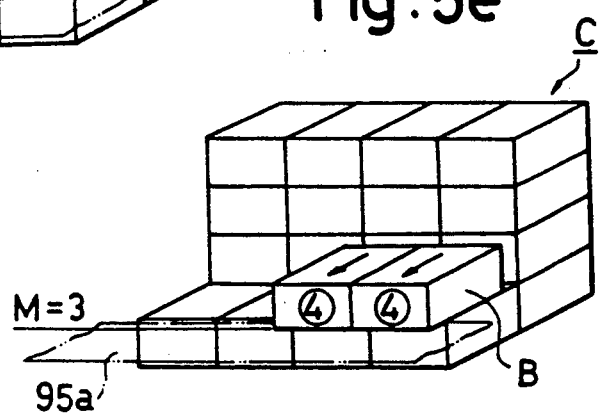
Figure 5F:
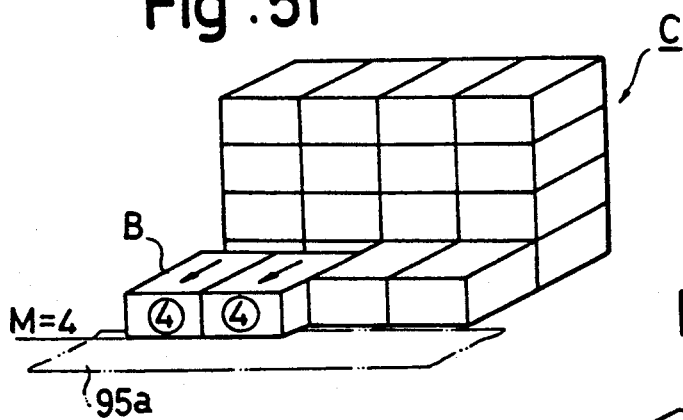
Figure 5G:
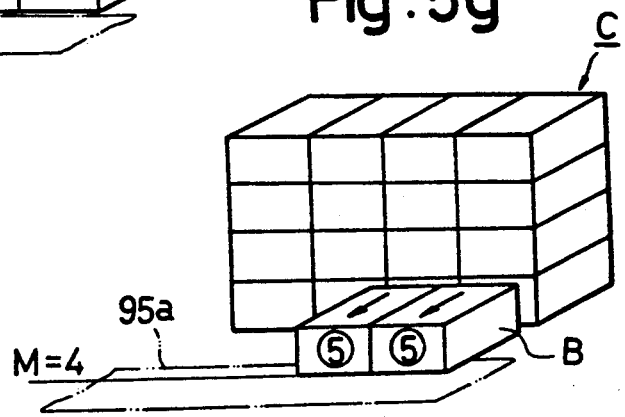

By inputting concrete numerical values, the take-out operation of the above-mentioned flow will be described in more detail with reference to FIGS. 5a through 5g. The initial goods accumulation group C, as shown in FIG. 5a, comprises 4 pieces (X pieces) of goods B accumulated in the horizontal direction, 4 pieces (Y pieces) accumulated in the height direction (vertical direction), and 2 pieces accumulated in the depth direction (forward and backward direction). Suppose that the goods B are taken out from the goods accumulation group C in such order as, for example, order number 2→6→2→4→2 ... When the order number P=2 is input into the computer first (step 1), the order number P=2 is added to the initial value P=0 of the sum of order number $P_T$ and the new sum P=2 of order number is registered (step 2). Then, it goes to step 3 where $P_T/X$, that is, 2/4 is calculated. When the quotient a=0 and the remainder b=2 has been registered, it goes to step 4 where the quotient a is compared with the level M of the lifting table 91a and it is judged whether the quotient a is the level M or more of the lifting table 91a. Since the quotient a is 0 which is smaller than the initial value M=1 of the lifting table 91a, it goes to step 6 where the sucking pads 93a of the bottom stage are turned on by the number corresponding to the remainder b, that is, 2 pieces and two pieces of goods B indicated by ① of FIG. 5b are drawn out. That is, the cylinder 93d is actuated to urge the sucking pads 93a against the corresponding two pieces of goods B to cause the sucking pads 93a to suck and draw such two pieces of goods B onto the goods receiving plate 95a. Then, the sucking pads 93a are turned off or kept being turned on, and the moving device 94 is actuated to rotate the base plate 93c by 90 degrees counterclockwise about the rotational shaft 94a in order to bring them into the states shown in FIG. 3c from the states shown in FIG. 3b, thereby to move the goods B to the push-in portion L. Thereafter, a rodless cylinder 95d of the push-in device 95 is actuated to cause the goods receiving plate 95a to advance to the container G side, thereby to push the two pieces of goods B into the container G. Then, when order number P=6 is input, it becomes the new sum of order number $P_T$=8 and 8/4 is calculated based on this sum of order number $P_T$=8 to find the quotient a=2 and the remainder b=0 (steps 1 through 3). Thereafter, in step 4, the quotient a=2 is compared with the level M=1 of the lifting table 91a. Since the quotient a is larger than the level M of the lifting table 91a, it goes to step 5-1 where the value of the level M of the lifting table 91a is substituted by the quotient a=2, that is, the lifting table 91a is lifted upward to level 2, and by turning all sucking pads 93a covering the two stages portion counted from the bottom up, the goods B indicated by ② of FIG. 5c are drawn out all at once. Thereafter, it goes to step 5-2 where the level M of the lifting table 91a is added with 1 and the lifting table 91a is lifted upward by one stage. Thereafter, b pieces of goods B are usually drawn by turning on b pieces of sucking pads 93a among the sucking pads 93a of the bottom stage. In this case, however, no drawing operation is performed because b is 0. And then, when order number P=2 is input, it becomes the sum of order number $P_T$=10, and 10/4 is calculated based on this new sum of order number $P_T$=10 to find the quotient a=2 and the remainder b=2 (steps 1 through 3). Then, the quotient a=2 is compared with the level M=3 of the lifting table 91a in step 4. Since the quotient a is smaller than the level M of the lifting table 91a, it goes to step 6 where two pieces of the sucking pads 93a of the bottom stage corresponding to the remainder b=2 are turned on to draw out the two pieces of goods B indicated by ③ of FIG. 5d. Then, when the order number P=4 is input, it becomes the new sum of order number $P_T$=14 and 14/4 is calculated to find the quotient a=3 and the remainder b=2 (steps 1 through 3). In step 4, the quotient a=3 is compared with the level M=3 of the lifting table 91a. Since the quotient a is equal to the level M of the lifting table 91a, it goes to step 5-1. Since the quotient a is equal to the level M of the lifting table 91a, the lifting table 91a is not moved and by turning all sucking pads 93a covering a stages portion counted from the bottom on, two pieces of goods B indicated by ④ of FIG. 5e are drawn out. Thereafter, it goes to step 5-2 where the level M=3 of the lifting table 91a is added with 1 to raise the lifting table 91a by one stage and then, the two pieces of sucking pads of the bottom stage corresponding to the remainder b=2 portion on to draw out the two pieces of goods B indicated by ④ of FIG. 5f. When the order number P=2 is input, it becomes the new sum of order number $P_T$=16 and 16/4 is calculated to find the quotient a=4 and the remainder b=0 (steps through 3). In steps 4, the quotient a=4 is compared with the level M=4 of the lifting table 91a. Since the quotient a is equal to the level M of the lifting table 91a, it goes to step 5-1 where the lifting table 91a is not moved as already mentioned above and by turning all sucking pads 93a covering stages portion counted from the bottom up, two pieces of goods B indicated by ⑤ of FIG. 5g are drawn out. When all goods B on the first row in the forward and backward direction have been taken out in the manner as mentioned above, the movement restraining plate 92a is advanced to move the goods B on the second row in the forward and backward direction to the front end of the lifting table 91a and the next taking out operation is performed in the manner as mentioned above.

Therefore, according to the present invention, the bottom level of the desired goods B among the goods accumulation group C, as mentioned above, is brought to be generally flush with the height of the goods receiving plate 95a by the lifting device 91, the goods B are restrained by the movement restraining device 92 in order not to be moved in a direction opposite to the taking out direction of the goods B, the goods accumulation group C is moved toward the sucking device 93 side, then a desired goods B is sucked by the sucking pad 93a in order to be drawn onto the goods receiving plate 95a. Then the goods B drawn onto the goods receiving plate 95a are moved to the push-in portion L of the container G while being in a state where the goods B are released from being sucked or kept being sucked. Then the goods B are pushed into the container G by the goods receiving plate 95a, or otherwise all goods B on the front row are taken out, then the goods B on the next row are moved to the front row and thereafter the goods B are taken out, thereby a desired number of goods B can be sequentially taken out of the goods accumulation group C comprising goods B and such taken-out goods B can be discharged into (stored in) the container G. Accordingly, a desired number of goods B can be rapidly and reliably taken out in an automatic manner and in a stable state. This can be particularly suitably used for picking operation of the goods B in a distribution center or the like.

EMBODIMENT 2

This embodiment is a second embodiment of the invention and an embodiment of a method of the present invention using the apparatus of this embodiment.

Figure 6:
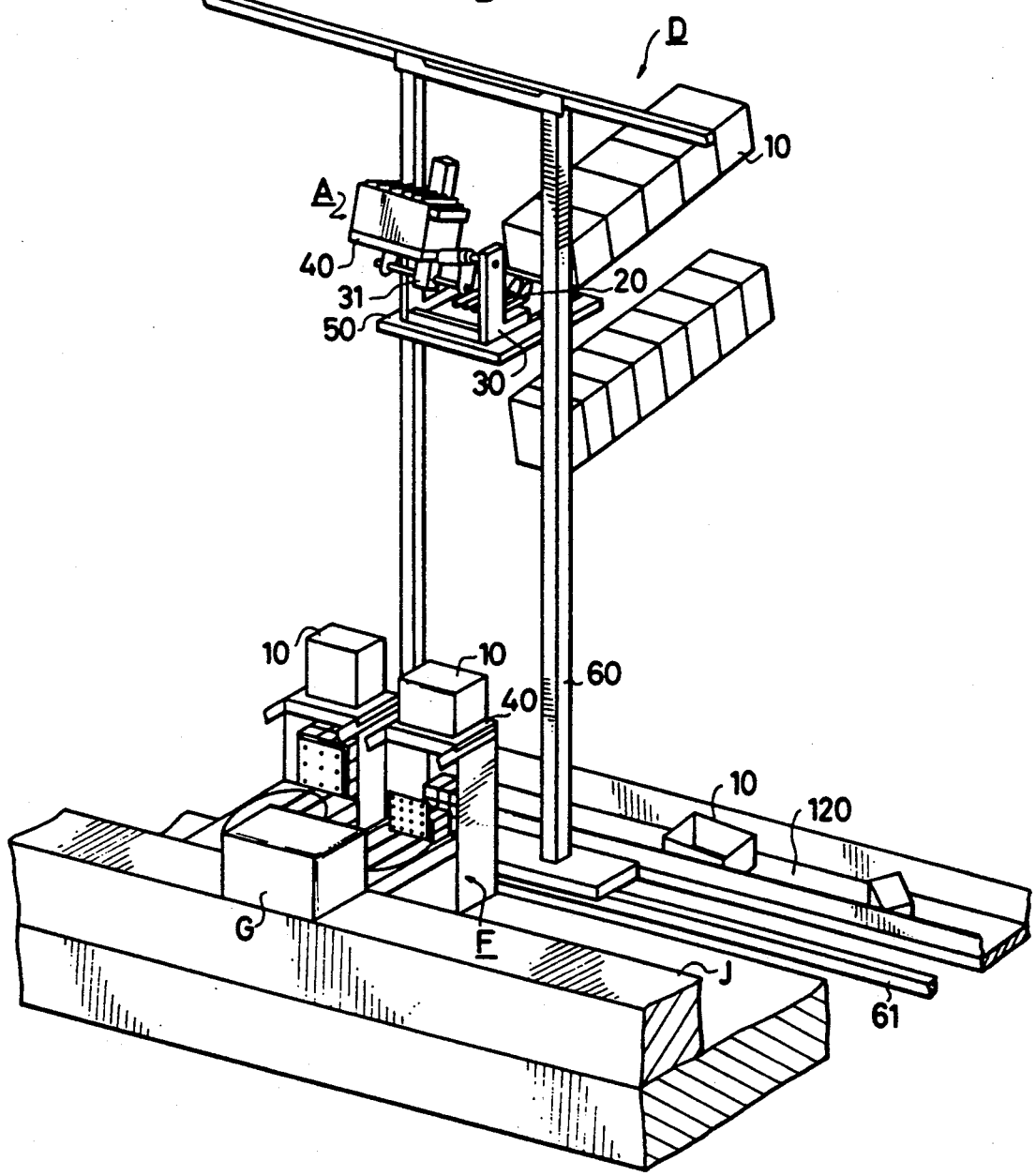
FIG. 6 is a perspective view showing a goods handling facility using a second embodiment of the goods handling apparatus of the present invention.
Figure 7:
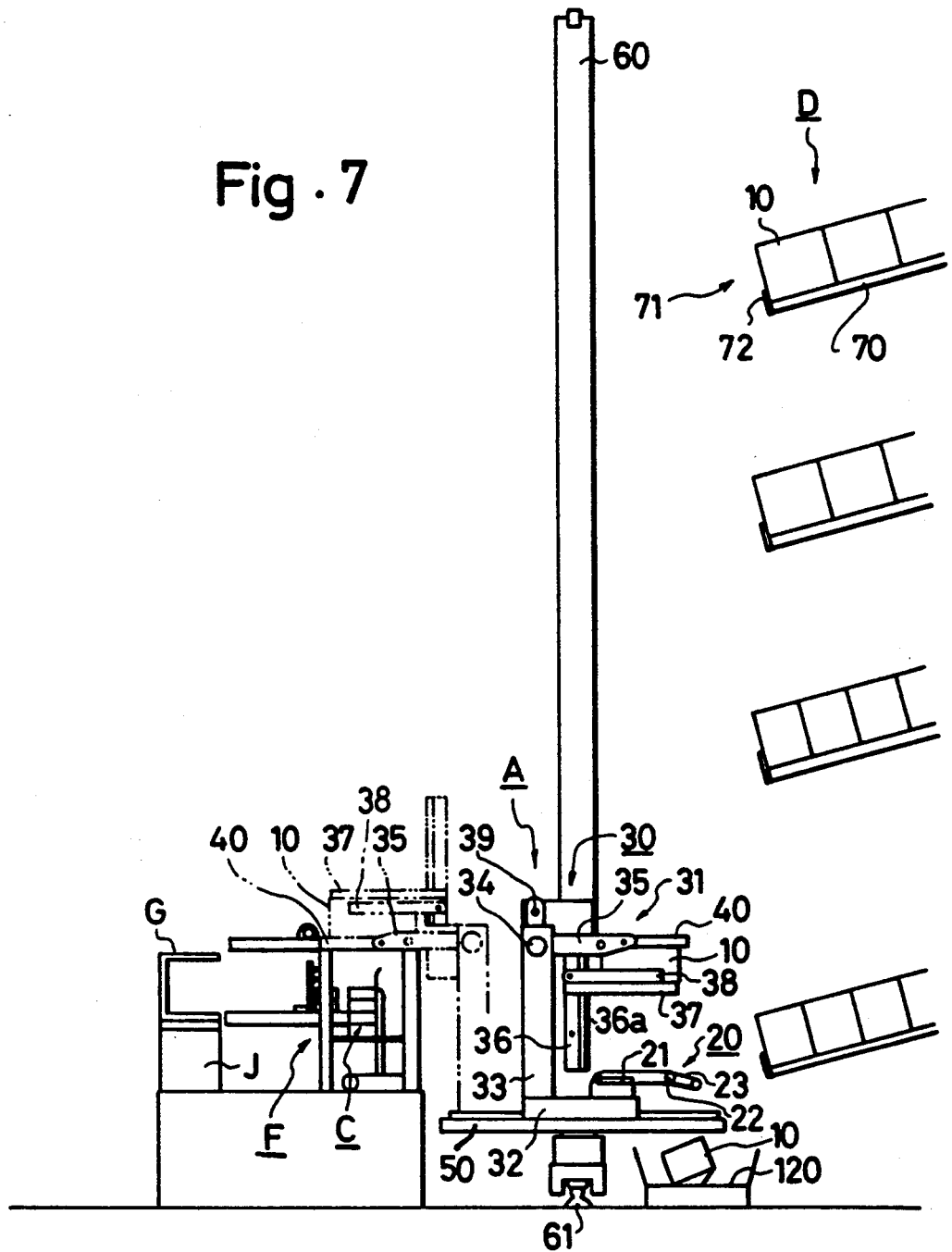
FIG. 7 is a side view of the embodiment of FIG. 6.

A goods take-out apparatus F according to an embodiment of the second apparatus invention, as shown in FIGS. 6 and 7, comprises a storage facility D for storing cases 10 containing the goods B as a goods accumulation group C as will be described afterward in a plurality of stages and in a plurality of rows, a goods shifting apparatus A disposed in such a manner as to be able to move upward and downward, and leftward and rightward at a front end of the storage facility D and adapted to shift the cases 10 from the storage facility D, a goods take-out device F disposed in such a manner as to be adjacent to the good shifting apparatus A and adapted to take out the goods B by a desired number from the goods accumulation group C which have been shifted from the cases 10 by the goods shifting apparatus A, a container G for storing the goods B which have been taken out from the goods take-out device F, and a carrier conveyor J for conveying the container G to the next process.

The goods shifting apparatus A comprises a case take-out device 20 for taking out a case 10 from the storage facility D, a superposing device 31 for listing the case 10 taken out by the case take-out device 20 and superposing the same on a goods take-out tool 40 disposed thereabove, an inverting device 30 for inverting the case 10 and the goods take-out tool 40 to take the goods to the goods take-out device F side as will be described afterward, a carriage 50 with the case take-out device 20, the inverting device 30 placed thereon, and a stacker crane 60 for vertically movably supporting the carriage 50 and able to reciprocally move rightward and leftward. And the goods handling facilities to which the goods take-out device F according to the second embodiment of the invention is applied is constructed in the same manner as the apparatus of the above-mentioned embodiment except for the goods take-out device F.

Also, the goods take-out device F of this embodiment, as shown in FIGS. 7, 8a, and 8b, comprises a lifting device 101 for receiving and supporting the goods accumulation group C from the case 10 inverted by the goods shifting apparatus A through the goods take-out tool 40 and for moving upward and downward the bottom surface of the desired number of goods B to the take-out position, a goods restraining device 102 for restraining the goods accumulation group C within the lifting device 101 in order not to move in the direction opposite to the take-out direction of the goods accumulation group C and for moving the goods accumulation group C toward the sucking device 103 side, the sucking device 103 for reciprocally moving the sucking tools (sucking pads) 103a corresponding to the arrangement of the goods B of the goods accumulation group C in the depth direction and for sucking and taking out a desired number of goods B, a goods receiving table 104a for receiving the goods B taken out by the sucking pad 103a of the sucking device 103, and a moving device 104 for moving the goods B taken out to the goods receiving table 104a to the push-in position (push-in portion) L, the goods B moved to the push-in portion L being pushed into the container G by the goods receiving table 104a.

The goods take-out tool 40, the case take-out device 20, the inverting device 30 which constitute the goods shifting apparatus A, as shown in FIGS. 6 through 8a and 8b, are constructed in the same manner as those of the above-mentioned EMBODIMENT 1. Therefore, description of the construction of these component parts will be omitted, and the goods take-out device F of this embodiment will be described with reference to FIGS. 8a and 8b.

The goods take-out device F is disposed between the carrier conveyor J for carrying the container G and the travel rail 61. The goods take-out device F is adapted to receive the goods accumulation group C from the goods take-out tool 40 and push a required number of goods B into the container G. The lifting device 101 receives the goods accumulation group C taken out of the case 10 through the goods take-out tool 40 and move upward and downward to a desired position. The lifting device 101, as shown in FIG. 8a, comprises the lifting table 101a on which the goods accumulation group C is placed, a wire 101b for lifting the four corners of the lifting table 101a, and a pair of pulleys 101c, 101d having the wire 101b wound thereon and rotatably mounted on the frame 106, and a motor (not shown) for driving the lower pulley 101d through a driving shaft 101 connected with belts 101e, 101e wound thereon.

Also, the movement retraining device 102, as shown in FIGS. 8a and 8b, contacts the goods accumulation group C supported on the lifting table 101a of the lifting device 101 from a rear side (right-hand side in FIG. 8b) thereof and moves the goods accumulation group C toward the container G. The movement restraining device 102 comprises a pair of sprockets 102d, 102e disposed beneath front and rear leg portions of the frame 106, a chain 102d looped around the sprockets 102c, 102e, and a movement restraining plate 102a connected with the chain 102d and erected around the leg portions through mounting metal pieces 102b, the movement restraining plate 102a being able to be reciprocally moved forward and backward by a drive motor 102f. The mounting metal piece 102b for supporting the movement restraining plate 102a is reciprocally moved along a cut-away groove (not shown) formed in the lifting table 101a. By moving (advancing) the movement restraining plate 102a toward the container G, the goods accumulation group C is brought to a front edge of the lifting table 101a and the backward movement of goods B is restrained. The goods accumulation group C advanced to the front edge of the lifting table 101a through the movement restraining device 102 is moved upward and downward to a position where the bottom level of desired goods B corresponds to the picking number by the lifting device 101, and a desired number of goods B are drawn into the goods receiving table 104a by the sucking device 103. The lifting device 101 and the goods restraining device 102 are constructed in the same manner as those in the afore-mentioned first embodiment of the invention.

The sucking device 103 comprises sucking pads 103a disposed in such a manner as to correspond to X pieces of goods B arranged in the width direction and Y pieces of goods B arranged in the height direction of the goods accumulation group C, a plate 103b on which the sucking pads 103a are attached, a rodless cylinder 103d disposed on a rear surface of the goods receiving table 104a in order to reciprocally move the plate 103b in the forward and backward direction, and a pair of moving pieces 103c, 103c for connecting the rodless cylinder 103d with the plate 103b and being able to move in the forward and backward direction along a pair of grooves 104b, 104b of the goods receiving table 104. Also, the moving device 104 comprises a disc-like goods receiving table 104a for receiving the goods B, a pair of grooves 104b, 104b formed in the goods receiving table 104a and adapted to guide the moving pieces 103c, 103c of the sucking device 103 in the forward and backward direction, an intermediate plate 104c disposed in such a manner as to surround the goods receiving table 104a in order to smoothly transfer the goods B, which have been transferred to the goods receiving table 104a from the lifting table 101a by the sucking pads 103a of the sucking device 103 guided by the pair of grooves 104b, 104b, into the container G from the goods receiving table 104a, and a motor 104d connected to the center of a rear surface of the goods receiving table 104a surrounded by the intermediate plate 104c and adapted to revolve by 180 degrees about a vertical axis. With the foregoing construction, by actuating the rodless cylinder 103d of the sucking device 103, the sucking pads 103a are moved in the forward and backward direction through the moving piece 103c and the plate 103b in order to be urged against the goods B and returning the sucking pads 103a, the goods B can be taken onto the goods receiving table 104a. By sequentially actuating the motor 104d of the moving device 104, the goods B, which have been taken onto the goods receiving table 104a, and swung by 180 degrees to the push-in portion L and by actuating the rodless cylinder 103d of the sucking device 103 again, the goods B can be pushed into the container G.

Next, one mode for carrying out a goods handling method (goods take-out method) employing the goods handling facilities using the goods take-out tool 40 and the goods take-out device F of this embodiment will be described.

In the gravity flow rack 70 in the storage facilities D, cases 10 containing, for example, goods accumulation group C consisting of one kind of goods B are plurally stored in the forward and backward direction. When the shutter 44 of the goods take-out tool 40 is opened and the goods accumulation group C within the case 10 is transferred to the lifting table 101a of goods take-out device F, the inverting device 30 is moved to a position corresponding to the goods take-out tool 40 to which the empty case 10 is placed by the traveling action of the stacker crane 60 and the vertical movement of the carriage 50 to advance the traveling table 32 toward the goods take-out tool 40, and the goods take-out tool 40 and the empty case 10 are held by the first clamping hand 35, the second clamping hand 37 and the centering hand 38. At that time, the engaging convex portion of the first clamping hand 35 is brought into engagement with the engaging concave portion 45 of the goods take-out tool 40. And after the superposing device 31 is rotated by approximately 10 degrees clockwise from the state indicated by the two dotted chain line of FIG. 7 about the rotary shaft 34, the traveling table 32 is advanced to a position indicated by the solid line in FIG. 7 and in the meanwhile, the superposing device 31 is further rotated by approximately 170 degrees (the state indicated by the solid line in FIG. 7) clockwise. Then, in order to discharge the empty case 10 onto a discharge conveyor 120, when the empty case 10 is lowered to the level of the fixed conveyor 21 by the second clamping hand 37 and the fixed conveyor 21 is rotated clockwise, the empty case 10 is drop discharged onto the discharge conveyor 120. At that time, in order to secure a dropping space for the case 10, the traveling table 32 is retreated from the take-out frontage 71 and the empty case 10 is dropped. After the empty case 10 has been dropped, the traveling table 32 is moved to a position corresponding to a predetermined take-out frontage 71 by the vertical movement of the carriage 50 and the traveling action of the stacker crane 60 and thereafter the traveling table 32 is advanced to the take-out frontage 71. Then, the swing conveyor 23 is swung counterclockwise about the supporting shaft 22, and the fixed conveyor 21 and the swing conveyor 23 are further rotated counterclockwise to take out the case 10 from the take-out frontage 71 onto the second clamping hand 37. When the traveling table 32 advances to the position indicated by the solid line, the traveling table 32 is moved to a position opposite a predetermined goods take-out device F by the vertical movement of the carriage 50 and the traveling action of the stacker crane 60, and the second clamping hand 37 is moved upward. At the same time, the case 10 is centered by the centering hand 38 in order to superpose the case 10 on the goods take-out tool 40 held by the first clamping device 35. As the case 10 is fed to the gravity flow rack 70 in such a state as having its opening on top, by superposing the goods take-out tool 40 on the opening portion of the case 10 and closing the opening portion by the shutter 44, the goods B contained in the case 10 are not dropped even if the case 10 is rotated by 180 degrees. The superposing device 31 is rotated counterclockwise by 170 degrees about the rotary shaft 34 to back the traveling table 32 away from the take-out frontage 71 and to advance it toward the goods take-out device F, and then the superposing device 3 is further rotated by 10 degrees counterclockwise to place the goods take-out tool 40 and the case 10 onto a frame 106 (the state indicated by the two dotted chain line of FIG. 7) in their inverted states and thereafter, the first clamping hand 35, and the centering hand 38 are opened to advance the traveling table 32 to a position as indicated by the solid line of FIG. 7, thereby to wait for the next shifting operation.

In this way, the case 10 is placed on the frame 106 of the goods take-out device F together with the goods take-out tool 40 to await the next shifting operation, and the goods B on the lifting table 91a of the goods take-out device F are taken out. The goods take-out tool 40 opens the shutter 44 and transfers the goods accumulation group C within the case 10 onto the lifting table 101a. At that time, in the goods take-out device F, the movement restraining plate 102a is retreated to a position (the position indicated by the two dotted chain line of FIG. 8b) where the movement restraining plate 102a and the lifting table 101a do not interfere with each other along the cutaway groove, and thereafter, the lifting table 101a is lifted upwardly to a position immediate below the goods take-out tool 40 and receives only the goods accumulation group C contained in the case C from the goods take-out tool 40 in which the shutter 44 was opened. Thereafter, the lifting table 101a is lowered until the bottom surface of the goods B of the uppermost stage of the goods accumulation group C is equal to a desired goods surface level (picking level)(see FIG. 8b) corresponding to the position of the goods receiving table 104a. The movement restraining plate 102a pushes the goods accumulation group C onto the lifting table 101a and stops at a position where the front surfaces of the goods accumulation group C are generally flush with the front end of the lifting table 101a. Then, when the sucking device 103 sucks the goods B by a desired number (order number) with its sucking pads 103a and actuates the rodless cylinder 103d to draw the goods B onto the goods receiving table 104a, the moving device 94 is actuated to incline the goods receiving table 104a by 180 degrees so that the goods B directly face the opening of the container G at the push-in portion L on the container G side. Thereafter, the rodless cylinder 103d is actuated again to advance the sucking pads 103a toward the container G side so that the goods B are pushed into the container G.

One mode for carrying out a goods take-out method using a goods take-out device F of this embodiment is such that the bottom level of the goods B on the bottom stage of the goods B which are ready to be drawn onto and supported by the goods receiving table 104a (i.e. the state where the upper stages of goods B are placed on lower stages of goods B, and in the foregoing state, the goods B are ready to be drawn onto the goods receiving table 104a). These goods B ready to be drawn are brought flush with the level of the goods receiving table 104a by the lifting device 101 so that a plurality of goods B are simultaneously taken out. This operation is performed in accordance with the control flow of FIG. 4.

Therefore, by inputting concrete numerical values, the take-out operation of the above-mentioned flow will be described in more detail with reference to FIGS. 4, and 9a through 9e.

Figure 9A:
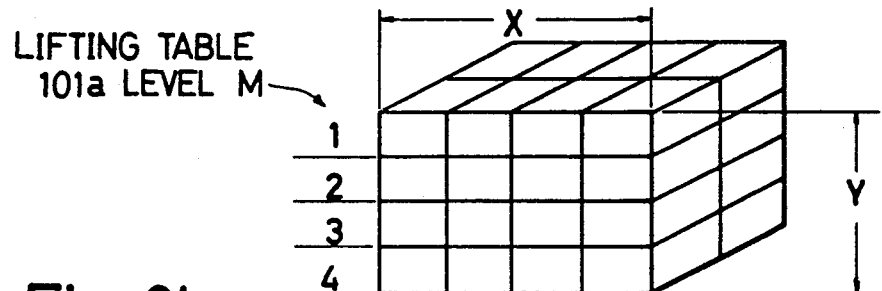
FIGS. 9a, 9b, 9c, 9d, and 9e are explanatory views for explaining the order for taking out goods.
Figure 9B:
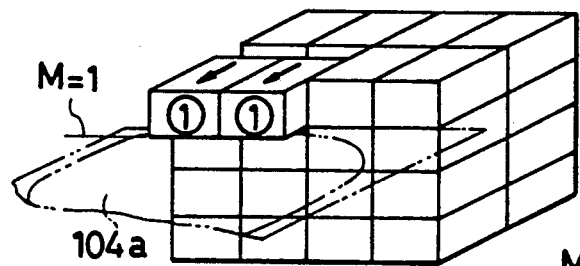
Figure 9C:
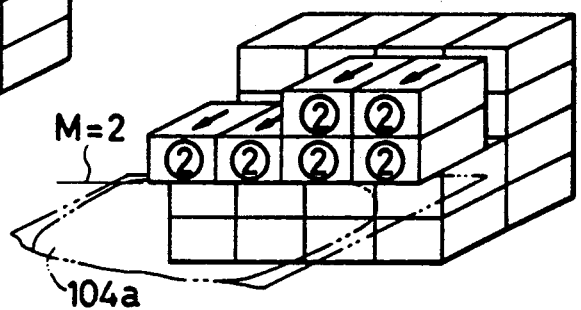
Figure 9D:
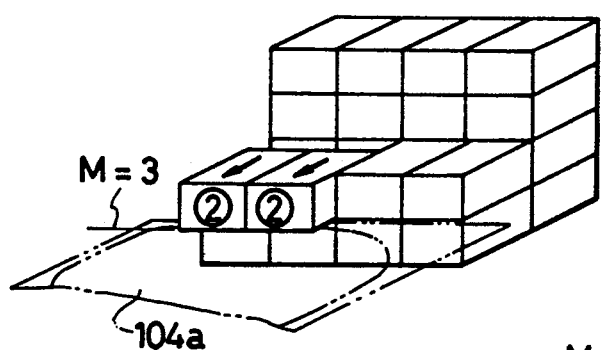
Figure 9E:
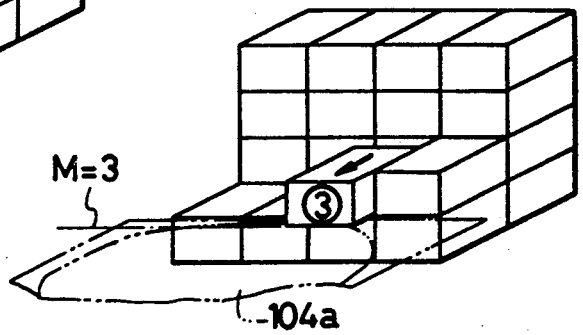
Figure 10A:
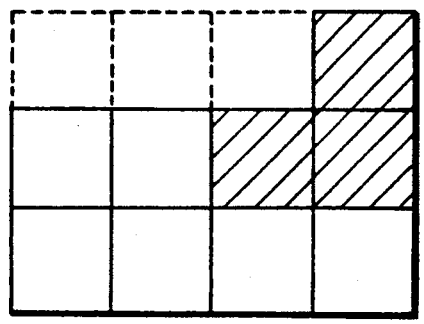
FIGS. 10a, 10b, 10c and 10d are explanatory views for explaining a goods take-out method and its order which are different from those of FIG. 4, FIGS. 5a through 5g and FIGS. 9a through 9e.
Figure 10B:
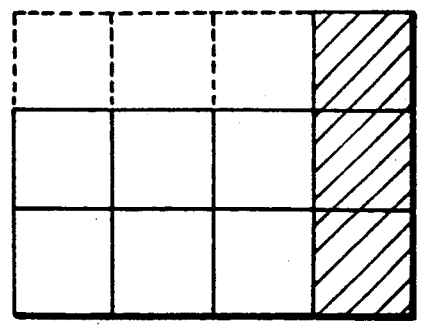
Figure 10C:
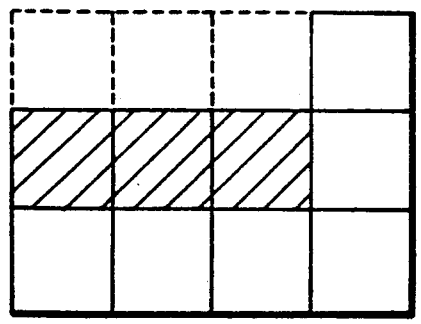
Figure 10D:
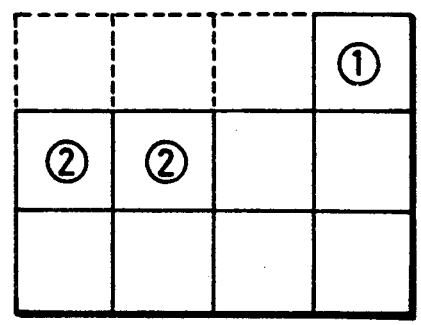

The initial goods accumulation group C, as shown in FIG. 9a, comprises 4 pieces (X pieces) of goods B accumulated in the horizontal direction, 4 pieces (Y pieces) accumulated in the height direction (vertical direction), and 2 pieces accumulated in the depth direction (forward and backward direction). Suppose that the goods B are taken out from the goods accumulation group C in such order as, for example, order number 2→8→1→2 . . . When the order number P=2 is input into the computer first (step 1), the order number P=2 is added to the initial value $P_T=0$ of the sum of order number $P_T$ and the new sum $P_T=2$ of order number is registered (step 2). Then, it goes to step 3 where $P_T/X$, that is, 2/4 is calculated. When the quotient a=0 and the remainder b=2 has been registered, it goes to step 4. Since the quotient a is smaller than the level M=1 of the lifting table 101a, it goes to step 6 where the sucking pads of the bottom stage are turned on by two piece portion and two pieces of goods B indicated by ① are drawn out (see FIG. 9b). That is, the rodless cylinder 103d is actuated to urge the sucking pads 103a against the corresponding two pieces of goods B to cause the sucking pads 103a to suck and draw such two pieces of goods B onto the goods receiving table 104a. Then, the rodless cylinder 103d of the sucking device 103 is actuated to advance the plate 103b toward the goods receiving table 104a side through the moving piece 103c in order to take the goods B onto the goods receiving table 104a. Then, the motor 104d is actuated to rotate the goods receiving table 104a by 180 degrees in order to move the goods B to the push-in portion L. After this rotation, the rodless cylinder 103d is actuated to cause the plate 103b and the sucking pads 103a to advance to the container G side, thereby to push the goods B into the container G. At the same time, the activation of the sucking pads 103 is stopped to release the goods B within the container G.

Then, when order number P=8 is input, it becomes the new sum of order number $P_T=10$ and 10/4 is calculated based on this sum of order number $P_T=10$ to find the quotient a=2 and the remainder b=2 (steps 1 through 3). Thereafter, in step 4, the quotient a=2 is compared with the level M=1. Since the quotient a is larger than the level M of the lifting table 101a, it goes to step 5-1 where the value of the level M of the lifting table 101a, that is, the lifting table 101a is substituted by the M=2 to lift the lifting table 101a upward to level 2, and by turning all sucking pads 103a covering the two stages portion counted from the bottom up, the goods B indicated by ② are drawn out all at once (see FIG. 9c). Thereafter, it goes to step 5-2 where the level M of the lifting table 101a is added with 1 so as to be substituted by M=3 and the lifting table 101a is lifted upward by one stage. Thereafter, two sucking pads 103a among the sucking pads 103a of the bottom stage are turned on in order to draw two pieces of goods B (see FIG. 9d). And when order number P=1 is input, it becomes the new sum of order number $P_T=11$, and 11/4 is calculated based on this sum of order number $P_T=11$ to find the quotient a=2 and the remainder b=3 (steps 1 through 3). Then, a=2 is compared with M=3 in step 4. Since the quotient a is smaller than the level M of the lifting table 101a, it goes to step 6 where the three pieces portion sucking pads 103a of the bottom stage are turned on to draw out one piece of goods B indicated by ③ (see FIG. 9e). The take-out operation is continued thereafter in accordance with the above-mentioned logic. When all goods B on the first row in the forward and backward direction have been taken out, the goods restraining plate 102a is advanced to move the goods B on the second row in the forward and backward direction to the front end of the lifting table 103a and the next taking out operation is performed in the manner as mentioned above.

Therefore, according to the present invention, the bottom level of desired goods B among the goods accumulation group C, as mentioned above, is brought to be generally flush with the height of the goods receiving table 104a by the lifting device 101, the goods B are restrained by the goods restraining device 102 in order not to move, and in that state, desired goods B are sucked by the sucking pad 103a in order to be drawn onto the goods receiving table 104a. Then the goods B drawn onto the goods receiving table 104a are moved to the push-in portion L of the container G. Then the goods B can be push discharged into a container by the sucking pads 103a. Therefore, a desired number of goods B can be rapidly and reliably taken out in an automatic manner and in a stable state and therefore, the same operation and effects as those of the method of the embodiment using the apparatus of the first embodiment of the invention can be expected.

Although there has been described a method for sequentially taken out the goods B on the first row in the forward and backward direction of the goods accumulation group C first from the above downward and from left to right at each stage in the above embodiments, it goes without saying that a goods handling method using the goods handling apparatus of the present invention is by no means limited to the above-mentioned embodiments and/or modes. For example, in order to draw out a desired number of goods B by one action, it may be arranged such that the steps 5-1 and 5-2 are simultaneously executed. Also, in case additional three pieces of goods B are taken out in a state where three pieces of goods B comprising four pieces arranged in the width direction and three pieces arranged in the height direction have been taken out, they may be taken out in accordance with the procedures of two steps as mentioned above or otherwise three pieces of goods B indicated by hatching of FIGS. 10a through 10c may be drawn out by one action. In these cases, as the taking out operation can be reduced from two steps to one step, a more efficient method for taking out the goods B can be obtained. Also, by registering a previous value of the remainder b in the computer as $b_o$, the goods B can be taken out by all sucking pads 93a (103a) covering a stages portion counted from the bottom excluding sucking pads 93a (103a) covering $b_o$ piece portion, that is, the sucking pads 93a (103a) covering $b_o$ piece portion being turned off, in step 5-1 of FIG. 4. Furthermore, in step 6, the goods B may be taken out by the sucking pads 93a (103a) covering b piece portion of the bottom stage excluding the sucking pads 93a (103a) covering $b_o$ piece portion, that is, the sucking pads 93a (103a) covering $b_o$ piece portion being turned off.

Also, in the above embodiments, the goods B are moved upward and downward. However, the goods handling apparatus of the present invention may be designed such that the sucking device 93 (103) and the goods receiving table 95a (104a) of the above-mentioned embodiments are moved upward and downward. Also, the goods handling apparatus of the present invention may be designed such that the sucking pads 93a (103a) of the goods take-out device F of the above-mentioned embodiments are not disposed in such a manner as to correspond to the arrangement of the goods accumulation group C consisting of the goods B arranged in the width direction by X pieces and in the height direction by Y pieces, but the sucking pads 93a (103a) covering one stage portion are arranged in the horizontal direction by X pieces. In that case, it is preferable that the speed of rotation of the goods receiving table 95a (104a) is set such that the goods B do not fly out due to centrifugal force.

Also, the goods handling apparatus of the present invention may be designed such that the goods shifting apparatus A is omitted and the case 10 is superposed on the goods take-out tool 40 by a worker's hand. The goods take-out tool 40 may also be omitted and the goods accumulation group C may be set on the lifting table 91a (101a) by a worker's hand. Also, it may be designed such that the goods B are directly taken into a tray-like container or onto a conveyor instead of the container G.

What is claimed is:

1. A method for sequentially removing a desired number of goods from an accumulation of goods, said accumulation having a plurality of goods in each of a height and depth direction and at least one good in a width direction, comprising the steps of:
   (1) locating said accumulation on a lifting table;
   (2) adjusting a height of said lifting table until a bottom surface of said desired number of goods to be removed is level with a goods receiving table;
   (3) removing said desired number of goods from said accumulation onto said goods receiving table using sucking tools;
   (4) inverting said sucking tools by rotating said sucking tools 90 degrees after said desired number of goods are removed;
   (5) transferring said desired goods from said goods receiving table into a container; and
   (6) advancing an adjacent row of goods into a place in said accumulation previously occupied by said desired number of goods.

2. A method for sequentially removing a desired number of goods from an accumulation of goods, said accumulation having a plurality of goods in each of a height and depth direction and at least one good in a width direction, comprising the steps of:
   (1) locating said accumulation on a lifting table;
   (2) adjusting a height of said lifting table until a bottom surface of said desired number of goods to be removed is level with a goods receiving table;
   (3) removing said desired number of goods from said accumulation onto said goods receiving table using sucking tools;
   (4) inverting said sucking tools by rotating said sucking tools 180 degrees after said desired number of goods are removed;
   (5) transferring said desired goods from said goods receiving table into a container; and
   (6) advancing an adjacent row of goods into a place in said accumulation previously occupied by said desired number of goods.

* * * * *